(12) United States Patent
Amici et al.

(10) Patent No.: US 6,822,781 B1
(45) Date of Patent: Nov. 23, 2004

(54) GYRICON DISPLAYS CONTAINING MODIFIED PARTICLES

(75) Inventors: Robert M. Amici, Berlin, MA (US); Dennis M. Dalton, Derry, NH (US); Collin P. Galloway, Nashua, NH (US)

(73) Assignee: Cabot Corporation, Boston, MA (US)

( * ) Notice: Subject to any disclaimer, the term of this patent is extended or adjusted under 35 U.S.C. 154(b) by 87 days.

(21) Appl. No.: 09/694,855

(22) Filed: Oct. 24, 2000

(51) Int. Cl.[7] ............................................. G09G 3/08
(52) U.S. Cl. ........................... 359/296; 345/107; 264/4; 264/7
(58) Field of Search .......................... 359/296; 428/323, 428/327, 407; 345/84, 107; 264/4, 7; 427/213.34, 213.31, 213.3, 213.36; 106/31.16, 31.32

(56) References Cited

U.S. PATENT DOCUMENTS

| | | | |
|---|---|---|---|
| 3,668,106 A | 6/1972 | Ota | 358/305 |
| 4,126,854 A | 11/1978 | Sheridon | 345/107 |
| 4,143,103 A | 3/1979 | Sheridon | 264/4 |
| 4,305,807 A | 12/1981 | Somlyody | 349/166 |
| 4,438,160 A | 3/1984 | Ishikawa et al. | 427/214 |
| 4,810,431 A | 3/1989 | Leidner | 264/15 |
| 5,262,098 A | 11/1993 | Crowley et al. | 264/8 |
| 5,344,594 A | 9/1994 | Sheridon | 264/4.1 |
| 5,554,739 A | 9/1996 | Belmont | 534/885 |
| 5,559,169 A | 9/1996 | Belmont et al. | 523/215 |
| 5,571,311 A | 11/1996 | Belmont et al. | 106/20 |
| 5,575,845 A | 11/1996 | Belmont et al. | 106/712 |
| 5,604,027 A | 2/1997 | Sheridon | 428/323 |
| 5,630,868 A | 5/1997 | Belmont et al. | 106/31.75 |
| 5,672,198 A | 9/1997 | Belmont | 106/20 |
| 5,698,016 A | 12/1997 | Adams et al. | 106/316 |
| 5,707,432 A | 1/1998 | Adams et al. | 106/31.6 |
| 5,708,525 A | 1/1998 | Sheridon | 359/296 |
| 5,713,988 A | 2/1998 | Belmont et al. | 106/31.6 |
| 5,717,514 A | 2/1998 | Sheridon | 359/296 |
| 5,717,515 A | 2/1998 | Sheridon | 359/296 |
| 5,737,115 A | 4/1998 | Mackinlay et al. | 359/296 |
| 5,739,801 A | 4/1998 | Sheridon | 345/84 |
| 5,751,268 A | 5/1998 | Sheridon | 345/107 |
| 5,754,332 A | 5/1998 | Crowley | 359/296 |
| 5,760,761 A | 6/1998 | Sheridon | 345/107 |
| 5,767,826 A | 6/1998 | Sheridon et al. | 345/84 |
| 5,777,782 A | 7/1998 | Sheridon | 359/296 |
| 5,803,959 A | 9/1998 | Johnson et al. | 106/31.75 |
| 5,808,783 A | 9/1998 | Crowley | 359/296 |
| 5,815,306 A | 9/1998 | Sheridon et al. | 359/296 |
| 5,825,529 A | 10/1998 | Crowley | 359/296 |
| 5,830,930 A | 11/1998 | Mahmud et al. | 523/215 |
| 5,837,045 A | 11/1998 | Johnson et al. | 106/31.85 |
| 5,851,280 A | 12/1998 | Belmont et al. | 106/472 |
| 5,869,550 A | 2/1999 | Mahmud et al. | 523/215 |
| 5,877,238 A | 3/1999 | Mahmud et al. | 523/215 |
| 5,885,335 A | 3/1999 | Adams et al. | 106/316 |
| 5,891,479 A | 4/1999 | Sheridon | 425/8 |
| 5,892,497 A | 4/1999 | Robertson | 345/107 |
| 5,895,522 A | 4/1999 | Belmont et al. | 106/31.6 |
| 5,900,029 A | 5/1999 | Belmont et al. | 8/550 |
| 5,900,192 A | 5/1999 | Richley | 264/8 |
| 5,900,858 A | 5/1999 | Richley | 345/107 |
| 5,914,805 A | 6/1999 | Crowley | 359/296 |
| 5,916,934 A | 6/1999 | Mahmud et al. | 523/215 |
| 5,917,646 A | 6/1999 | Sheridon | 359/296 |
| 5,919,409 A * | 7/1999 | Sheridon | 264/8 |
| 5,919,841 A | 7/1999 | Mahmud et al. | 523/351 |
| 5,922,118 A * | 7/1999 | Johnson et al. | 106/31.6 |
| 5,930,026 A | 7/1999 | Jacobson et al. | 359/296 |
| 5,948,835 A | 9/1999 | Mahmud et al. | 523/215 |
| 5,955,232 A | 9/1999 | Little et al. | 430/106 |
| 5,961,804 A | 10/1999 | Jacobson et al. | 204/606 |
| 5,968,243 A | 10/1999 | Belmont et al. | 106/31.65 |
| 5,976,428 A | 11/1999 | Richley | 264/10 |
| 5,977,213 A | 11/1999 | Mahmud et al. | 523/351 |
| 5,982,346 A | 11/1999 | Sheridon et al. | 345/85 |
| 5,989,629 A | 11/1999 | Sacripante et al. | 427/180 |
| 6,017,980 A | 1/2000 | Wang et al. | 523/215 |
| 6,042,643 A | 3/2000 | Belmont et al. | 106/472 |
| 6,045,955 A | 4/2000 | Vincent | 430/45 |
| 6,054,071 A | 4/2000 | Mikkelsen, Jr. | 246/1.36 |
| 6,055,091 A * | 4/2000 | Sheridon et al. | 359/296 |
| 6,097,531 A | 8/2000 | Sheridon | 359/296 |
| 6,110,538 A | 8/2000 | Sheridon | 427/457 |
| 6,110,994 A | 8/2000 | Cooke et al. | 523/215 |
| 6,130,773 A | 10/2000 | Jacobson et al. | |
| 6,241,921 B1 * | 6/2001 | Jacobson et al. | 264/1.36 |
| 6,249,271 B1 | 6/2001 | Albert et al. | |
| 6,479,571 B1 * | 11/2002 | Cooke et al. | 523/215 |
| 6,534,569 B2 * | 3/2003 | Mahmud et al. | 523/333 |

FOREIGN PATENT DOCUMENTS

| | | | |
|---|---|---|---|
| WO | WO96/37547 | 11/1996 | C08L/21/00 |
| WO | WO97/47691 | 12/1997 | C09C/1/56 |
| WO | WO98/47971 | 10/1998 | C09C/1/50 |
| WO | WO99/23174 | 5/1999 | C09C/1/56 |
| WO | WO99/31175 | 6/1999 | C08K/9/04 |
| WO | WO99/51690 | 10/1999 | C09B/69/00 |
| WO | WO99/63007 | 12/1999 | C09C/1/56 |
| WO | WO 99/67678 A3 | 12/1999 | G02F/1/167 |
| WO | WO00/22051 | 4/2000 | C09C/1/56 |

* cited by examiner

*Primary Examiner*—Hung Dang
*Assistant Examiner*—Tuyen Tra

(57) ABSTRACT

A gyricon display containing modified particles is disclosed. The gyricon display has an arrangement of bichromal or polychromal elements which are disposed between a first and second electrode. One of the electrodes is substantially visually transparent. The display also has means for creating a potential difference between the two electrodes. Also, each bichromal element has two hemispheres, wherein one of the hemispheres has at least a surface containing at least one modified colored pigment having attached at least one organic group and the other hemisphere has at least a surface with a different color and different electrical property. The organic group preferably includes at least one ionic, ionizable group, or both. Each bichromal or polychromal element is enclosed within a shell wherein a liquid is present between the shell and the element so that the element is free to rotate in response. Methods of making the gyricon display are also disclosed.

29 Claims, No Drawings

GYRICON DISPLAYS CONTAINING MODIFIED PARTICLES

BACKGROUND OF THE INVENTION

The present invention relates to gyricon displays and display systems. The present invention, more particularly, relates to gyricon displays and display systems, using particles, such as pigments, which improve the display.

U.S. Pat. Nos. 5,961,804 and 5,930,026, for instance, describe electrophoretic displays using microcapsules which contain a suspension of particles in a dielectric fluid. Through the use of two electrodes which are located on opposite sides of the microcapsule arrangement, a potential difference can cause the particles to migrate toward one of the electrodes thus forming images or text on a display which is located on one of the electrodes since one of the electrodes is transparent. The electrophoretic displays form images and text through the use of a potential difference between two electrodes and a quantity of charged particles. If these charged particles agglomerate they would not remain suspended in the dielectric fluid, and the ability to form a reusable display of images or text can be greatly diminished if not made problematic.

U.S. Pat. No. 5,604,027 describes electric paper using bichromal balls having two hemispheres where one is typically black and the other is white. Each of the hemispheres has different electrical properties and the balls are enclosed within a spherical shell wherein the shell is filled with liquid to form a microsphere so that the ball is free to rotate in response to an electrical field. These microspheres can then be mixed into a substrate which can be formed into sheets or can be applied to any kind of surface. This can then be used to form an image from an applied electrical field.

For this system to work properly, each hemisphere of the bichromal balls must have different electrical properties. To achieve this difference in electrical properties for the two hemispheres, for example, U.S. Pat. No. 4,143,103 describes a sphere comprised of black polyethylene with a light reflective material such as titanium dioxide sputtered on the one hemisphere. U.S. Pat. No. 4,438,160 describes a ball prepared by coating white glass balls with an inorganic colorant by evaporation. In a similar process ("The Gyricon—A Twisting Ball Display" published in the proceedings of the S.I.D., Vol. 18/3 and 4 (1977)), the material used to form the bichromal ball was conductive such as glass containing a heavy loading of titanium dioxide and half of this ball was coated with a dense layer of a non-conductive black material. Further, U.S. Pat. Nos. 5,262,098 and 5,344,594 describe a method of forming bichromal balls by bringing together streams of differently colored hardenable liquids. Unfortunately, with this current type of technology, the ability to achieve a diverse combination of colors is quite limited and further, the clarity of the image formed when an electrical field is applied can be improved.

U.S. Patents, like U.S. Pat. No. 5,717,514, relate to multi-segmented balls for the electrical twisting ball display device wherein the ball is composed of segments arrayed substantially parallel to one another. Each segment can be a different color and have a difference in electrical properties. Put another way, each segment would have a different optical modulation characteristic and be anisotropic in order to provide an electrical dipole moment. As before, the ball is rotatably disposed in a non-oscillating electric field. As described in these patents, polymeric material, such as plastics, are used to create the various segments which can contain a dispersion of pigments to create the various colors. In addition, some of these patents emphasize the need to make smaller and size consistent multi-segmented or polychromal balls in order to create images which are more defined. Essentially, the technology is going toward smaller and smaller particles to obtain high pixel resolution in order to create sharper and more defined images and text. As a result, there is an increasing need to have a defined amount of pigment or other colorant in each polychromal or bichromal ball. Thus, there is a need to ensure that pigment is adequately and uniformly dispersed in the various materials used to form the polychromal or bichromal balls. Furthermore, since there is an increasing demand on the level of pigment that must exist in each polychromal ball, again, there would be a need to ensure that large amounts of pigment can be introduced into the polymer used to form the polychromal balls. This can be a problem since large amounts of pigments in polymeric materials lead to agglomeration or non-uniform dispersion of the pigment in the polymer. Accordingly, there is a need to improve upon the display technology in order to ensure that clear and visually sharp images can be obtained using display technology and pigment particles. Each of the above cited patents and publications are incorporated in their entirety herein by reference.

SUMMARY OF THE PRESENT INVENTION

A feature of the present invention is to provide gyricon displays which provide sharp and clear images on the display.

Another feature of the present invention is to provide a gyricon display having a variety of different color combinations that can be displayed.

A further feature of the present invention is to provide a gyricon display having bichromal or polychromal balls that have uniform and high concentrations of pigment in each ball.

An additional feature of the present invention is to provide methods of making polychromal or bichromal balls wherein each ball contains a uniform distribution of pigment and/or high concentration of pigment.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a gyricon display having an arrangement of bichromal balls and first and second electrodes disposed on and covering opposite sides of the arrangement. One of the electrodes is substantially visually transparent. The display also has means for creating a potential difference between the two electrodes. Also, each bichromal ball has two hemispheres, wherein one of the hemispheres includes a modified colored pigment having attached at least one organic group and the other hemisphere has at least a surface with a different color and different electrical properties than the first hemisphere. Each ball is enclosed within a shell to form a capsule wherein a liquid is present between the shell and the ball, so that the ball is free to rotate in response to an electric field. The organic group preferably contains an ionic and/or ionizable group wherein the organic group preferably on the surface contributes to the rotation of the ball towards one of the electrodes when there is a potential difference created between the two electrodes.

The present invention further relates to bichromal balls having two hemispheres, wherein one of the hemispheres has a surface comprising a modified colored pigment having attached at least one organic group and the other hemisphere having a surface with a different color and different electrical properties than the first hemisphere. Each ball is enclosed within a shell to form a capsule wherein a liquid is present between the shell and the ball, so that the ball is free to rotate in response to an electrical field. The organic group contains an ionic and/or ionizable group. The organic group on the surface causes the ball to rotate in response to an electrical field.

The present invention also relates to bichromal balls having two hemispheres as described above, wherein a modified colored pigment having attached at least one organic group forms some part of the bichromal ball. For instance, the modified colored pigment can be a coating or be part of the core of the bichromal balls, or both.

In addition, the present invention relates to a gyricon display having an arrangement of polychromal balls and first and second electrodes disposed on and covering opposite sides of the arrangement. One of the electrodes is substantially visually transparent. The display also has means for creating a potential difference between the two electrodes. Also, each polychromal ball contains at least two segments, wherein at least one of the segments includes a modified colored pigment having attached at least one organic group and at least one other segment has a different color and different electrical properties than the first segment. Each polychromal ball is enclosed within a shell to form a capsule wherein a liquid is present between the shell and the ball, so that the ball is free to rotate in response to an electric field. The organic group preferably contains an ionic and/or ionizable group.

The present invention also relates to the polychromal balls described above.

The present invention in addition relates to a visual display device or display media containing an arrangement of particles, wherein an optical response results from the rotation of the particles in a fluid, wherein a portion of the particles contains (within the particles or on the surface of the particles) at least one organic group having an ionic group, ionizable group, or both. The optical response which is achieved can be initiated by an electric field, magnetic field, or other means to cause the controlled rotation of the particles to achieve the optical response.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to a gyricon display and a display system. The gyricon display has an arrangement of bichromal balls and first and second electrodes disposed on and covering opposite sides of the arrangement. One of the electrodes is substantially visually transparent. The gyricon display also has means for creating a potential difference between the two electrodes. Also, each bichromal ball has two hemispheres. One of the hemispheres has a surface and/or other part of that hemisphere containing a modified colored pigment having attached at least one organic group and the other hemisphere has a surface with a different color and different electrical properties than the first hemisphere. Each bichromal ball is enclosed within a shell wherein a liquid is present between the shell and the ball, so that the ball is free to rotate in response to an electrical field or other means that cause the ball to rotate to produce an optical response. For purposes of the present invention, the bichromal ball within a shell is also known as a capsule. The organic group mentioned above preferably contains an ionic and/or ionizable group. When the organic group is on or near the surface of one of the hemispheres, the organic group causes the ball to rotate (or contributes to the rotating) toward one of the electrodes when there is a potential difference or electrical field created between the two electrodes. By permitting the select rotation of the bichromal balls to one of the electrodes, images including text can be created at, for example, the electrode which is visually transparent or at some other visually transparent layer.

The present invention further relates to the above-described bichromal balls which have two hemispheres. One of the hemispheres has a surface and/or other part thereof containing a modified colored pigment having attached at least one organic group and the other hemisphere has a surface with a different color and different electrical properties from the first hemisphere. Each ball is enclosed within a shell wherein a liquid is present between the shell and the ball, so that the ball is free to rotate in response to an electrical field. The organic group preferably contains an ionic and/or ionizable group, wherein, the organic group causes the ball to rotate in response to an electrical field.

Another embodiment of the present invention relates to a rewritable display media in which an optical response results from the rotation of particles in an electric field, wherein at least a portion of the particles comprises modified particles having attached at least one organic group preferably having at least one ionic group or ionizable group or both.

The electrode for purposes of the present invention can be any conventional electrode which satisfies the needs of the display. For instance, the electrode can be a semiconductor located on a substrate such as glass, mylar, and the like. Such electrodes as described in U.S. Pat. Nos. 3,668,106 and 4,305,807 (both incorporated in their entirety by reference) can be used for purposes of the present invention. The means to obtain an electrical field can also be achieved using the arrangement described in U.S. Pat. Nos. 5,604,027; 4,126,854; and 4,143,103, all incorporated in their entirety by reference.

A driver circuit, for instance, can be electrically connected to the electrodes which is capable of creating a potential difference between the electrodes to cause rotation of the bichromal balls or particles to one or to the other electrode within the desired switching time.

With respect to the bichromal balls, as indicated above, the bichromal balls have a shell surrounding or encapsulating each ball and there is a liquid located in the space between the ball and the shell so that the ball is free to rotate in response to an electrical field. The liquid can be any liquid which is compatible with the ball. Preferably, the liquid is a dielectric fluid such as a hydrophobic liquid. The liquid is generally chosen based on viscosity, dielectric constant, charge, and density. Examples of suitable liquids include, but are not limited to, plasticizing liquids, such as silicone oils. The fluid must also be compatible with the shell so as to not deteriorate or dissolve the shell which is encapsulating the fluid and the ball. The dimensions of the overall bichromal ball having the shell can vary and are preferably from about 5 to about 500 microns, and more preferably from about 25 to about 250 microns.

The shell encapsulating the liquid and the ball can be made from any suitable material which again is resistant to the liquid as well to the material comprising the ball. The shell can be formed using a variety of encapsulation techniques known in the art such as, for example, precipitation of a polymer dissolved in a solvent. The formation of the liquid within the shell can be done following the techniques described in U.S. Pat. No. 5,604,027, incorporated in its entirety by reference herein, and involves the conventional use of microencapsulation using a coating applied to the bichromal ball which is then immersed in a dielectric fluid and results in plasticizing the coating which causes the coating to swell. This process will drive the liquid into the space between the ball and the shell at least partially filling it. The bichromal ball with the shell can then be formed more fully with a second liquid that diffuses more rapidly through the shell than the first liquid.

The bichromal ball located within the shell, as stated earlier, has two hemispheres. One of the hemispheres contains a modified colored pigment having attached at least one organic group. The surface of the other hemisphere has a surface with a different color and different electrical properties. Both hemispheres can contain a modified colored pigment wherein the color of the modified colored pigment is different for each hemisphere. One of the modified colored pigment containing hemispheres has a neutral organic group or an ionic or ionizable group which is opposite in charge to the ionic and/or ionizable group on the other hemisphere.

For purposes of the present invention, in lieu of a bichromal ball, any bichromal element having an axis of rotation, which upon rotation produces an optical response can be used in the present invention in the embodiments described above and throughout this application. Examples of bichromal elements include, but are not limited to, rods, cylinders, needles, and the like. In the bichromal element, like for the bichromal ball, the bichromal element has one hemisphere which contains a modified colored pigment having attached at least one organic group. The surface of the other hemisphere has a surface with a different color and different electrical properties. As before, the bichromal element is enclosed within a shell wherein a liquid is present between the shell and the element, so that the element is free to rotate in response to an electrical field or other means that causes the rotation of the element to produce an optical response.

In addition, in the present invention, polychromal balls or elements can be used in lieu of bichromal balls or elements in the embodiments described in this application. With respect to the polychromal balls or elements, the polychromal ball or element can be a multisegmented ball or element. Each segment can be a different color and have different electrical properties. One or more of the segments can contain the modified colored pigment of the present invention. Generally, if the modified colored pigments of the present invention are used, the organic group and the pigment are preferably different for each segment in order to achieve the difference in color and electrical properties. The present invention can be particularly applied to the polychromal balls or elements. In a preferred method of making these polychromal elements, such as described in U.S. Pat. Nos. 5,919,409; 5,737,115; 5,717,514; and 5,708,925, all incorporated in their entirety by reference herein, these segments are formed as part of the polychroimal ball or element by forming polymer liquids containing pigments. The pigment is dispersed in the polymer liquid and ultimately these segments are formed together into a hardened polychromal ball by the techniques described, for instance, in these patents referenced above. The use of the modified colored pigments of the present invention preferably permits a high concentration of pigment as well as a uniform dispersion of the pigment in the polymeric liquid used to form the segment due to the high compatibility of the modified colored pigments with the polymers used in the formation of the segments. As a result, the polychromal ball or element will have a high concentration of modified colored pigment as well as a uniform concentration thereby leading to particles, preferably having small diameters, having high concentrations of pigment as well as uniform concentrations of pigment. This type of particle would then lead to high resolution displays.

In addition, in any of the displays disclosed herein, different sizes of elements can be used in the same arrangement to achieve a variety of advantages including a more dense arrangement of elements. Accordingly, the present invention permits small bichromal or polychromal elements, such as balls, containing high concentrations of pigment as well as uniform concentrations of pigment which leads to the above-described advantages including high resolution capabilities.

For purposes of the present invention, the various hemispheres or differences in segments can be also described as segments or hemispheres which are anisotropic.

For purposes of the present invention, though the preferred mechanism for controlling the rotation of the bichromal or polychromal elements is through the use of an electrical field, the rotation of the elements can also be caused by a magnetic field, light, or other means of controlling the rotation of the bichromal or polychromal elements.

Generally speaking, there are several embodiments which can make use of the modified pigments having attached at least one organic group. For instance, the bichromal balls can be prepared from a monochromal ball comprising a modified colored pigment having attached at least one organic group, wherein the organic group includes an ionic and/or ionizable group. Then, one of the hemispheres of this ball, will be treated such that the ionic and/or ionizable group which is attached is neutralized or oppositely charged by treating the ionic and/or ionizable group with a counter ionic or counter ionizable group such that there is an opposite charge applied. The neutralizing or opposite charging can be done with a colored pigment coating in order to alter the color as well as the charge. For example, a sphere containing a modified colored pigment can be sputter coated with titanium dioxide in a process as described in U.S. Pat. No. 4,143,103, incorporated in its entirety herein by reference. This would result in the formation of a bichromal ball with a neutral white hemisphere and a charged colored hemisphere.

Another option with respect to the bichromal balls is to use a monochromal ball containing a conventional colorant such as those described in U.S. Pat. No. 4,143,103. For example, a sphere comprised of a black polyethylene can be used. One of the hemispheres of this particle can then be coated with a modified colored pigment having attached at least one organic group such that the color and the electrical properties are different from the color particle forming the bichromal ball. Any coating process known to one skilled in the art may be used, including, for example, spray coating, dip coating, printing, and the like.

Another option is to again form a monochromal ball with a modified colored pigment and to coat one of the hemispheres with a second modified colored pigment which has a different charge or no charge wherein the modified pigment coating would be a different color and lead to the coated hemisphere having a different electrical property.

The bichromal balls can also be formed by merging two streams of molten color material, for example two liquid epoxies containing curing agents, one with titanium dioxide and the other with a modified colored pigment having attached at least one organic group. With such a bichromal ball, at least one of the hemispheres contains a modified colored pigment having attached at least one organic group. Modified colored pigments are particularly well suited for such a method. The organic group(s) of the modified pigments can improve the dispersibility within the materials comprising the hemisphere. This would provide for a well dispersed charge and therefore improved response to an applied electric field.

In previous attempts to make the capsules containing the bichromal ball and fluid, typically a suspension or other type of polymerization was used which causes the encapsulation of the bichromal ball. In achieving the formation of such a capsule it is preferred to have a uniform suspension of the bichromal ball in a fluid in order to fully and uniformly encapsulate the bichromal ball. The present invention makes this quite possible since at least a portion of the bichromal ball contains a colored pigment having attached at least one organic group having an ionic and/or ionizable group, which enables the balls to be more substantially and uniformly suspended in the fluid. Thus, a need for suspension aids can be avoided. Accordingly, the present invention enables a uniform distribution of bichromal balls such that the formation of the capsules containing the bichromal balls are quite uniform and fully encapsulate the bichromal ball. These advantages would also apply to bichromal and polychromal elements in general For purposes of the present invention, the modified pigment used as the bichromal ball and/or as a coating on the bichromal ball or as part of the bichromal ball is a particle(s) having at least one organic group attached to the particle(s). Preferably, the particle is a pigment particle. The pigment can be any of a wide range of colors. The particles can be any size and is preferably from about 100 microns or more to less than one micron and preferably have a size range of from about 0.05 microns to about 25 microns.

At least a portion of the bichromal balls or elements used in the displays of the present invention comprise particle(s) having an attached at least one organic group. The choice of organic groups is dependent on the desired charge and the degree of compatibility with the fluid, capsule material, and/or hemisphere compound. It is desirable to maximize the charge while minimizing the overall interaction of the ball or element with the surrounding materials.

As discussed previously, bichromal balls or elements have been prepared by several different processes. In one process, a monochromal ball (for example, a polymer or glass sphere colored with a pigment such as titanium dioxide) is deposited on the surface of a substrate, and the top half (that is, the only accessible half) is subsequently sputter-coated with a chargeable alternative colored pigment (such as a metallic black). The resulting bichromal ball has two different colors which produce different surface charges in the fluid used.

A dispersion of modified colored pigment containing at least one organic group can also be used in this process. Thus, for example, an aqueous dispersion of a modified carbon black having attached carboxylic or sulfonic acid groups can be used to produce a surface coating on the top half of a polymer sphere colored with titanium dioxide, for instance. This would produce a bichromal sphere in which the black half would carry a large negative zeta potential compared to the zeta potential of the titanium dioxide-based core material. Modified carbon blacks containing attached quaternary ammonium groups could be used to generate a positive zeta potential. Modified colored pigments such as cyan, magenta, and yellow could also be used. This process would offer the advantage that sputter-coating would not be needed. Thus, the colored surface would be prepared by an easier and potentially cheaper coating operation. Also, these charged colored pigments could be mixed and matched in a variety of unique ways. Thus, for example, a monochromal ball containing a modified cyan pigment containing attached quaternary ammonium groups could be partially coated with a dispersion of a modified magenta pigment containing attached carboxylic acid groups to create a bichromal ball with a negative red side and a positive blue side. Other combinations can be used. The modified pigments may further have attached two or more different types of organic groups, such as, for example, polymeric groups, in order to obtain the desired dispersion quality within the monochromal ball.

A second process known in the art to prepare bichromal spheres uses two side-by-side molten or liquid "streams" of differently colored hardenable materials. These steams can be combined by several different methods to form bichromal balls. For example, the two streams (for example, two liquid epoxies containing curing agents, one colored with titanium dioxide and one colored with carbon black) can be combined in such a way that the droplets from these two streams flow towards each other and combine without mixing to form a side-by-side stream as a free jet. The leading edge of this free jet becomes unstable and breaks to form bichromal droplets which are cured into the desired balls. Such a process is described in U.S. Pat. Nos. 5,344,594 and 5,262,098, both incorporated in their entirety by reference. In addition, a process can be used in which two semi-circular pigmented polymers (for example, polyethylene pigmented white and polymethylene containing magnetite) are coextruded to form a bichromal fiber which is then chopped and spherodized into the desired bichromal balls. This process is described in U.S. Pat. No. 4,810,431, incorporated in its entirety herein by reference.

Modified colored pigments can also be used in either or both of the two hardenable streams described above. This would result in the formation of bichromal balls with two different surface charges. Thus, for example, combining a molten wax stream containing a modified carbon black containing attached quaternary ammonium groups with a molten polyethylene phase containing a modified yellow pigment containing a sulfonic acid group would result in the formation of a half-black/half-yellow bichromal ball which would also have two electrically dissimilar surfaces. As described above, modified pigments further containing additional attached groups, such as polymeric groups, can provide an additional level of design flexibility to obtain an improved dispersion of the pigment within the molten phases.

In a third process, a bichromal sphere is prepared from a polarizable, low melting monochromal ball encapsulated in a protective shell. The encapsulated ball is then heated to melt the core, and polarized in an electric field. After cooling to resolidify the core, the resulting poles remain in place— the charge dissipation is much slower in solid form than in the molten liquid form. This core is then colorized using, for example, sputter-coating techniques.

A modified pigment containing at least one attached organic group can be used as the polarizing material in the core. Upon charging, the modified colored pigments would migrate to one pole, thus polarizing the core. Upon cooling and solidifying, the modified colored pigments would remain well dispersed within the core, (i.e., locked in place).

In addition, as described above, modified colored pigments can also be used to replace the sputter-coating step with a more efficient and potentially cheaper surface coating operation.

In a fourth process, monochromal spheres are prepared by the aggregation and coalescence of resin and colorant with an inorganic salt. These spheres are then used as a seed for a polymerization to produce a polymeric coating which provides the needed surface charging ability. This is then colorized in a sputter-coating process as described above. Modified colored pigments could be used in this process. For example, a polymer latex can be combined with an aqueous dispersion of a modified pigment resulting in a charged colored sphere. Since the resulting sphere containing a modified pigment already has the desired charge, this would eliminate the need for the seed polymerization step described in U.S. Pat. No. 5,989,629 (incorporated in its entirety herein by reference) which in the past was needed in order to provide a chargeable material. This would be a very efficient and economical process for producing a charged monochromal sphere. In addition, pigments which have also been modified with a polymeric organic group would provide additional design flexibility and added stability.

The benefits of the present invention can be used in the displays for instance, described in U.S. Pat. Nos. 5,604,027; 4,126,854; 4,143,103; 6,110,538; 6,097,531; 6,055,091; 6,054,071; 5,989,629; 5,982,346; 5,976,428; 5,919,409; 5,917,646; 5,914,805; 5,900,858; 5,900,192; 5,892,497; 5,891,479; 5,825,529; 5,815,306; 5,808,783; 5,777,782; 5,767,826; 5,760,761; 5,754,332; 5,751,268; 5,739,801; 5,737,115; 5,717,515; 5,717,514; 5,708,525; 5,604,027; 5,344,594; 5,262,098; all incorporated in their entirety by reference herein.

The arrangement can be any shape, such as flat or curved and typically is a two dimensional arrangement which has various thicknesses. The arrangement can be accomplished by packing the capsules against one another in an array or dispersing the microscopic containers or capsules in a transparent matrix and the like.

The display that is used in the present invention can be any conventional display used to display images such as those used in liquid-crystal displays. The capsules, for instance, can be inserted into a cell housing the two electrodes. The capsules can also be applied into a display by any various means known to those skilled in the art involving the insertion of microcapsules on a substrate. The display can be arranged in any number of designs including unitary displays, continuous displays, and the like.

The pigment as used above can be, but is not limited to, pigments traditionally used in ink compositions (including inkjet ink compositions), coating compositions (including paint formulations), liquid and solid toners, films, plastics, rubbers, and the like. Examples include, but are not limited to, black pigments (e.g., carbon products like carbon black) and other colored pigments (e.g., polymeric and organic pigments).

The desired colored pigment may be chosen from a wide range of conventional colored pigments. For instance, the pigment product can be any carbon product capable of reacting with a diazonium salt to form the modified pigment product. The carbon may be of the crystalline or amorphous type. Examples include, but are not limited to, graphite, carbon black, vitreous carbon, activated charcoal, activated carbon, carbon fibers, and mixtures thereof. Finely divided forms of the above are preferred. It is also possible to utilize mixtures of different pigment products.

The colored pigment can be blue, black, brown, cyan, green, white, violet, magenta, red, yellow, as well as mixtures thereof. Suitable classes of colored pigments include, for example, carbon black, other carbon products, anthraquinoncs, phthalocyaninc blues, phthalotyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982), incorporated in its entirety herein. The color pigment will typically have a wide range of BET surface areas, as measured by nitrogen adsorption.

Also, for purposes of the present invention, the carbon product can be an aggregate comprising a carbon phase and a silicon containing species phase. A description of this aggregate as well as means of making this aggregate is described in PCT Publication No. WO 96/37547 and WO 98/47971 as well as U.S. Pat. Nos. 5,830,930; 5,869,550; 5,877,238; 5,919,841; 5,948,835; and 5,977,213. All of these patents and publications are hereby incorporated in their entireties herein by reference.

The carbon product for purposes of the present invention, can also be an aggregate comprising a carbon phase and metal-containing species phase where the metal-containing species phase can be a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal-containing species phase is described in U.S. Pat. No. 6,017,980, also hereby incorporated in its entirety herein by reference.

Also, for purposes of the present invention, the carbon product includes a silicacoated carbon black, such as that described in U.S. Pat. No. 5,916,934 and PCT Publication No. WO 96/37547, published Nov. 28, 1996, also hereby incorporated in their entirety herein by reference.

The ball or element for purposes of the present invention can also be a ball or element where one-half of the ball or element contains silica or other metal oxides and the other half of the ball or element contains carbon black, wherein the particles forming each half are bound together as a polymer hardened mass. The advantage of such a ball or element is the ability to form an extremely small ball or element since the silica and carbon black, for instance, used in the formation of the polymer mass can be introduced as extremely small particles such as below one micron. As a result, the ball or element containing the silica and carbon black are extremely small and therefore quite useful in providing a high resolution display. The silica and/or carbon black can be treated so as to contain one or more different types of organic groups as described above and throughout this application.

As indicated above, the modified particle is preferably a colored pigment having attached at least one organic group. The organic group preferably contains a) at least one aromatic group, at least one $C_1$–$C_{100}$ alkyl group, or mixtures thereof; and further contains b) at least one ionic group, ionizable group, or mixtures thereof.

At least one aromatic group includes, but is not limited to, unsaturated cyclic hydrocarbons containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like). At least one $C_1$–$C_{100}$ alkyl group may be branched or unbranched, substituted or unsubstituted.

An ionizable group is one capable of forming an ionic group in the medium of use. The ionic group may be an anionic group or a cationic group and the ionizable group may form an anion or cation.

Ionizable functional groups forming anions or anionic groups include, for example, acidic groups or salts of acidic groups. The organic groups, therefore, include groups derived from organic acids. Preferably, when an organic group contains an ionizable group forming an anion, such an organic group has a) an aromatic group or a $C_1$–$C_{100}$ alkyl group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group or the alkyl group of the organic group is directly attached to the colored pigment. The aromatic group may be further substituted or unsubstituted, for example, with alkyl groups. More preferably, the organic group is a phenyl or a naphthyl group and the acidic group is a sulfonic acid group, a sulfonic acid group, a phosphonic acid group, or a carboxylic acid group. Most preferably, the organic group is a substituted or unsubstituted sulfophenyl group or a salt thereof; a substituted or unsubstituted carboxyphenyl; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Examples of organic groups that are anionic in nature include, but are not limited to, —$C_6H_4COO^-X^+$; —$C_6H_4$—$SO_3^-X^+$; —$C_6H_4$—$(PO_3)^{-2}2X^+$; —$C_6H_2(COO^-X^+)_3$; —$C_6H_3$—$(COO^-X^+)_2$; —$(CH_2)_2$—$(COO^-X^+)$; —$C_6H_4$—$(CH_2)_2$—$(COO^-X^+)$, wherein $X^+$ is any cation such as $Na^+$, $H^+$, $K^+$, $NH_4^+$, $Li^+$, $Ca^{2+}$, $Mg^{2+}$ and the like and z is an integer from 1 to 18. As recognized by those skilled in the art, $X^+$ may be formed in-situ as part of the manufacturing process or may be associated with the aromatic or alkyl group through a typical salt swap or ion-exchange process.

Amines represent examples of ionizable functional groups that form cations or cationic groups and may be attached to the same groups as discussed above for the ionizable groups which form anions. For example, amines may be protonated to form ammonium groups in acidic media. Preferably, an organic group having an amine substituent has a $pK_b$ of less than 5. Quaternary ammonium groups (—$NR_3^+$), quaternary phosphonium groups (—$PR_3^+$) and sulfonium groups (—$SR_2^+$) also represent examples of cationic groups. Preferably, the organic group contains an aromatic group such as a phenyl or a naphthyl group and a quaternary ammonium or a quaternary phosphonium or sulfonium group. Quaternized cyclic amines, and even quaternized aromatic amines, can also be used as the organic group. Thus, N-substituted pyridinium compounds, such as N-methyl-pyridyl, can be used in this regard.

Examples of organic groups that are cationic in nature include, but are not limited to, —$C_6H_4N(CH_3)_3^+Y^-$, —$C_6H_4COCH_2N(CH_3)_3^+Y^-$, —$C_6H_4(NC_5H_5)^+Y^-$, —$(C_5H_4N)C_2H_5^+Y^-$, —$(C_3H_5N_2)^+Y^-$ (imidizoles), —$(C_7H_7N_2)^+Y^-$ (indizoles), —$C_6H_4COCH_2(NC_5H_5)^+Y^-$, —$(C_5H_4N)CH_3^+Y^-$, and —$C_6H_4CH_2N(CH_3)_3^+Y^-$, wherein $Y^-$ is any halide or an anion such as $NO_3^-$, $OH^-$, $CH_3COO^-$ and the like; or combinations thereof. As recognized by those skilled in the art, $Y^-$ may be formed in-situ as part of the manufacturing process or may be associated with the aromatic or alkyl group through a typical salt swap or ion-exchange process.

Further examples of representative organic groups and methods of attachment are also described in U.S. Pat. Nos. 5,554,739; 5,559,169; 5,571,311; 5,575,845; 5,630,868; 5,672,198; 5,698,016; 5,837,045; 5,922,118; 5,968,243; 6,042,643; 5,900,029; 5,955,232; 5,895,522; 5,885,335; 5,851,280; 5,803,959; 5,713,988; 5,707,432; and 6,110,994; and International Patent Publication Nos. WO 97/47691; WO 99/23174; WO 99/31175; WO 99/51690; WO 99/63007; and WO 00/22051; all hereby incorporated in their entirety by reference herein. The groups and methods of attachments described in International Published Application Nos. WO 99/23174 and WO 99/63007, can also be used and are incorporated in their entirety by reference herein.

Further examples of the ionic or ionizable functional groups include amphiphilic counterions which may be cationic or anionic in nature. An amphiphilic counterion is a molecule or compound typically described as have a hydrophilic polar "head" and a hydrophobic "tail." Representative examples of cationic and anionic amphiphilic counterions include those set forth and described in U.S. Pat. No. 5,698,016 to Adams et al., the entire description of which is incorporated herein by reference.

For purposes of further illustrating the present invention, an amphiphilic counterion can be used. The modified colored pigment, as described herein, preferably has a cationic functionality (i.e. positive charge) or anionic functionality (negative charge). The charge preferably is created by the ionic or ionizable group of the aromatic group or $C_1$–$C_{100}$ alkyl group attached to the pigment. If the desired modified colored pigment is anionic in nature, then the amphiphilic counterion will be cationic or positive charging. Similarly, if the modified colored pigment is cationic in nature, then the amphiphilic counterion will be anionic or negative charging. Examples of cationic amphiphilic counterions include, but are not limited to, those described ammonium ions that may be formed from adding acids to the following: a fatty amine, an ester of an aminoalcohol, an alkylamine, a polymer containing an amine functionality, a polyethoxylated amine, a polypropoxylated amine, a polyethoxylated polypropoxylated amine, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine. The $pK_a$ of the ammonium ion is preferably greater than the $pK_a$ of the protonated form of the aromatic or alkyl group on the pigment.

Specific examples of cationic amphiphilic ions include dioctylammonium, oleylammonium, stearylammonium, dodecylammonium, dimethyidodecylammonium. stearylguanidinium, oleylguanidinium, soyalkylammonium, cocoalkylammonium, oleylammoniumethoxylate, protonated diethanolaminedimyristate, and N-oleyidimethylammonium. Generally, to form the ammonium ions described above, the various compounds described above such as fatty amines, esters of amino alcohols, etc., are reacted with an acid such as carboxylic acid, a mineral acid, an alkyl sulfonic acid, or an aryl sulfonic acid.

Quaternary ammonium salts can also he used as the sources of the cationic amphiphilic ion. Examples include, but are not limited to, a fatty alkyl trimethyl ammonium, a di(fatty alkyl)dimethylammonium, an alkyl trimethyl ammonium, or 1-alkyl pyridinium salt, where the counterion is a halide, methosulfate, sulfonate, a sulfate or the like. Also, phosphonium salts, such as tetraphenylphosphonium chloride can be used as the sources of the amphiphilic ion.

Cationic amphiphilic ions for use in the present invention include those represented by the formula $R_4N^+$, wherein R is independently hydrogen, $C_1$–$C_{30}$ alkyl, $C_1$–$C_{30}$ alkenyl, $C_7$–$C_{30}$ aralkyl, and $C_1$–$C_{30}$ alkaryl. Another example of a suitable amphiphilic ion is a polymer containing an ammonium ion derived from an amine containing polymer. The amine containing polymer can be a copolymer of an amine containing monomer, such as dimethylaminoethyl methacrylate or -acrylate, or vinylpyridine or vinylimidazole, and another monomer such as methyl acrylate, methyl methacrylate, butyl acrylate, styrene, and the like. The polymer may also be a polyethyleneimine (PEI) derivitized or acylated PEI, polyallylamine, or polydiallylamine. The polymer may also be a ter- or tetra-polymer containing a mixture of an amine containing monomer and two or three other amine containing monomers, respectively. Such a polymer may be prepared by any means, such as radical (emulsion, suspension, or solution) or anionic polymerization, stable free radical polymerization or atom transfer polymerization.

As stated earlier, the amphiphilic counterion can alternatively be an anionic amphiphilic counterion. Examples of such anionic amphiphilic ions include, but are not limited to, an alkylbenzene sulfonate, an alkyl sulfonate, an alkylsulfate, a sulfosuccinate, a sarcosine, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group. Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myrisitic acid salt, a caproic acid salt, sodium 2-octyldodecanoate, sodium bis(2-ethylhexyl) sulfosuccinate, a sulfonated polystyrene, or homo or copolymers of acrylic acid or methacrylic acid or salts thereof.

Generally, the above-identified amphiphilic counterions and related compounds are commercially available in salt form or can be routinely made by one of ordinary skill in the art.

Other examples of organic groups that can be attached onto the colored pigment include the following formulas. In each of the following formulas, —X is attached directly to the pigment and —X' can be directly attached to the pigment. Each of the following organic groups, for purposes of the present invention, further contain an ionic group, an ionizable group, or both.

A further example of modified pigment product is a colored pigment having attached at least one group comprising the formula:

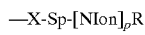
—X-Sp-[NIon]$_p$R wherein X represents an aromatic group or an alkyl group, NIon represents at least one non-ionic group, Sp represents a spacer group, R represents hydrogen, an aromatic group, or an alkyl group, and p is an integer of from 1 to 500.

The aromatic group with respect to the X substituent and/or the R substituent can be substituted or unsubstituted and can be, for instance, an aryl or heteroaryl group. The aromatic group can be substituted with any group, such as one or more alkyl groups or aryl groups. Preferably, the aromatic group is a phenyl, naphthyl, anthracenyl, phenanthrenyl, biphenyl, pyridinyl, benzothiadiazolyl, or benzothiazolyl. Examples of the alkyl group with respect to the X substituent and/or the R substituent include, but are not limited to, substituted or unsubstituted alkyl groups which may be branched or unbranched. The alkyl group can be substituted with one or more groups, such as aromatic groups. Preferred examples of the alkyl group for purposes of the X substituent include, but are not limited to, $C_1$–$C_{12}$, like methyl, ethyl, propyl, butyl, pentyl, or hexyl groups. In other words, X and/or R can represent a branched or unbranched, substituted or unsubstituted, saturated or unsaturated hydrocarbon. Examples of substituted groups include, but are not limited to, an ester group, an amide group, an ether group, a carboxyl group, an aryl group, an alkyl group, and the like.

Sp or the spacer group as used herein is a link between two groups and can be a bond, or a chemical group such as, but not limited to, $CO_2$, $SO_2CH_2CH_2$, $CH_2CH_2$, CHR"$CH_2$, $CH_2$CHR", CHR", $O_2C$, $SO_2$, CO, $SO_3$, $OSO_2$, $SO_3$NR", R"N$SO_2$, NHCO, CONR", NR"$CO_2$, $O_2$CNR", NR"CONR", O,S, NR", $SO_2C_2{}_{H4}$, arylene, alkylene, NR"CO, NHCO$_2$, $O_2$CNH, NCHONH, and the like, wherein R", which can be the same or different, represents an organic group such as a substituted or unsubstituted aryl and/or alkyl group.

Examples of the non-ionic group include, but are not limited to, groups having no apparent ionic charge, such as polymers of ethylene oxide, propylene oxide, other alkylene oxides, carboxylic acid esters, glycols, alcohols, esters, alkanolamine-fatty acid condensates, silicones, isocyanates, alkylpyrrolidenes, and alkylpolyglycosides. In non-aqueous media, the non-ionic group, in addition to the aforementioned groups, may have carboxylates, sulfonates, phosphates, amines, and other groups that typically demonstrate an ionic nature in water. The non-ionic group is preferably a $C_1$–$C_{12}$ alkyl group, or a $C_1$–$C_{12}$ alkylene oxide group. p can be 1–25, 26–50, 51–75, 75–100, and/or 101–500, and p preferably is 5 to 50.

The X substituent and/or non-ionic group may be substituted with one or more functional groups. The functional group preferably contains a lypophilic group. Examples of functional groups include, but are not limited to, R', OR', COR', COOR', OCOR', carboxylates, halogens, CN, $NR'_2$, $SO_3H$, sulfonates, $—OSO_3^-$, NR'(COR'), $CONR'^2$, $NO_2$, $PO_3H_2$, phosphonates, phosphates, N=NR', SOR', $NSO_2R'$, wherein R' which can be the same or different, is independently hydrogen, branched or unbranched $C_1$–$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkylaryl, or substituted or unsubstituted arylalkyl.

Amines also represent examples of functional groups as well as quaternary ammonium groups ($—NR_3^+$) and quaternary phosphonium groups ($—PR_3^+$), as well as quaternary sulfonium groups ($—SR_2^+$).

In an additional embodiment of the present invention, the colored pigment product can be a pigment having attached at least one group comprising the formula:

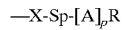
—X-Sp-[A]$_p$R wherein X represents an aromatic group or an alkyl group; Sp represents a spacer group; A represents an alkylene oxide group of from about 1 to about 12 carbons; p represents an integer of from 1 to 500, and R represents hydrogen, a substituted or unsubstituted alkyl group, or a substituted or unsubstituted aromatic group. A can be the same of different when p is greater than 1. X can be substituted or unsubstituted and can include substituted groups such as an ester group, an amide group, an ether group, a carbonyl group, an aryl group, an alkyl group and the like. The substituted groups can be attached or linked to A.

Examples of preferred alkylene groups include, but are not limited to, $—CH_2—CH_2—O—$; $—CH(CH_3)—CH_2—O—$; $—CH_2—CH_2CH_2—O—$; $—CH_2CHCH_3—O—$; or combinations thereof.

In another embodiment of the present invention, the colored pigment can be a pigment having attached at least one group comprising the formula:

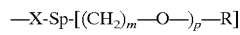
—X-Sp-[(CH$_2$)$_m$—O—]$_p$—R]

wherein X is described above, and for instance can represent an aromatic group or an alkyl group as described earlier, m is an integer of from 1 to 12, preferably 2 or 3, p is an integer of from 1 to 500, Sp represents a spacer group, and R is described above, and for instance can be hydrogen, a substituted or unsubstituted alkyl group, or a substituted or unsubstituted aromatic group. Examples of R substituents include, but are not limited to, hydrogen, methyl, ethyl, butyl, or propyl groups. p can be 1–25, 26–50, 51–75, 76–100, and 101–500, and is preferably 5 to 50. Particularly preferred groups of this formula are where X is a phenylene group, m is 1 to 5, and more preferably 2 or 3, p is 5 to 50, more preferably 44–45, and R is hydrogen or a methyl group. Another preferred group is where m is 2, p is 7, R is a methyl group, and X is a phenylene group.

In yet another embodiment of the present invention, the colored pigment can be a pigment having attached at least one polymeric group, wherein the polymeric group comprises the formula:

—X-Sp-[polymer]R wherein X and Sp are described above, and for instance can represent at least an aromatic group or at least an alkyl group as described earlier, "polymer" comprises repeating monomer groups or multiple monomer groups or both, optionally having at least one —X' group. The 'polymer' can be substituted or unsubstituted with additional groups, and R is described above, and for instance can represent hydrogen, a bond, a substituted or unsubstituted alkyl group, or a substituted or unsubstituted aromatic group. When X represents an alkyl group, the "polymer" preferably has no ionic or ionizable group. X' represents an aromatic group or alkyl group, and each X' and X can be the same or different. The total monomer repeating units that comprise the "polymer" is not greater than about 5,000 monomer repeating units. X and/or X' can be substituted or unsubstituted and can include substituted groups such as an ester group, an amide group, an ether group, and the like. The substituted groups can be linked to the "polymer." Also, when R represents a bond, the available bond can be attached to the pigment. When X represents an alkyl group in this formula, the polymeric group preferably has no ionic or ionizable group. The polymeric group can be any polymeric group capable of being attached to a pigment.

For purposes of the present invention and this formula immediately above, one or more polymeric groups that comprise the "polymer" can be present. The polymeric group can be a thermoplastic polymeric group or a thermosetting polymeric group. Further, the polymeric group can be a homopolymer, copolymer, terpolymer, and/or a polymer containing any number of different repeating units. Further, the polymeric group present in the present invention can be any type of polymeric group, such as a random polymer, alternating polymer, graft polymer, block polymer, star-like polymer, and/or comb-like polymer. The polymeric group used in the present invention can also be one or more polyblends. The polymeric group can be an interpenetrating polymer network (IPN); simultaneous interpenetrating polymer network (SIN); or interpenetrating elastomeric network (IEN).

Specific examples of polymeric groups include, but are not limited to, linear-high polymers such as polyethylene, poly(vinylchloride), polyisobutylene, polystyrene, polycaprolactam (nylon), polyisoprene, and the like. Other general classes of polymeric groups of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polysiloxanes, poly(vinyl alcohols), polyurethanes, thermoplastic elastomers, and the like.

Generally, the polymeric groups described in Volume 18 of the Encyclopedia of Chemical Technology, KIRK-OTHMER, (1982), page 328 to page 887, and Modern Plastics Encyclopedia '98. pages B-3 to B-210, and "Polymers: Structure and Properties," by C. A. Daniels, Technomic Publishing Co., Lancaster, Pa. (1989), all incorporated in their entirety herein by reference, can be used as the polymeric groups of the present invention.

The polymeric groups of the present invention can be prepared in a number of ways and such ways are known to those skilled in the art. The above referenced KIRK-OTHMER section, Modern Plastics Encyclopedia, and C. A. Daniels' reference provide methods in which these polymeric groups can be prepared.

The polymeric group is preferably a polyolefin group, a polyurethane group, a polystyrenic group, a polyacrylate group, a polyamide group, a polyester group, or mixtures thereof. Examples of R groups can be the same as previously described above. p can be 1–25, 26–50, 51–75, 76–100, 101–500, and is preferably 1 to 100, and more preferably 5 to 50.

Also, the organic group(s) attached to the colored pigment can be one or more types of dyes, such as, but not limited to, Nile Blue A, Toluidine Blue, Tryan Blue, C.I. Acid Blue 40, C.I. Acid Blue 129, C.I. Acid Blue 9, C.I. Acid Blue 185, C.I. Direct Blue 71, C.I. Direct Blue 199, C.I. Direct Red 9, C.I. Acid Red 18, C.I. Acid Red 27, C.I. Direct Yellow 86, C.I. Direct Yellow 4, C.I. Acid Yellow 23, and C.I. Food Black 2. Besides the organic group comprising the dye, an organic group having an ionic group and a counterionic group can have a dye serving as the counterionic group. Attaching a dye to the colored pigment can provide the advantage of modifying the color properties of pigments. Also, the organic group(s) attached to the colored pigment can be one or more types of light stabilizers, e.g., hindered amine light stabilizer (HALS) or antioxidant.

In an embodiment of the present invention, the modified particle can be a polymer coated modified pigment product. The modified pigment product is at least partially coated with one or more polymers and can be substantially or fully coated by one or more polymers The use of the term "coated" includes partially and fully coated carbon products and modified pigment products. The polymer in this invention, partially or fully encapsulates the modified pigment product, wherein the modified pigment product is the core and the polymer is the shell. The polymer(s) coated onto or used to encapsulate the modified pigment product is preferably present on the modified pigment product such that the polymer(s) is not substantially extractable by a solvent. More preferably, the polymer(s) on the modified pigment product is attached by physical (e.g., adsorption) and/or chemical means (e.g. chemical bonding, grafting).

The pigment product coated with a polymer can be a modified pigment product having at least one organic group attached to the pigment product. Preferably, the organic group is substituted with an ionic, ionizable, or polar group. The pigment product which has the organic group attached thereto can be any pigment product capable of having at least one organic group attached to the pigmnent product.

Another set of organic groups which may be attached to the pigment are organic groups having an aminophenyl, such as $(C_6H_4)$—$NH_2$, $(C_6H_4)$—$CH_2$—$(C_6H_4)$—$NH_2$, $(C_6H_4)$—$SO_2$—$(C_6H_4)$—$NH_2$. Organic groups also include aromatic sulfides, represented, for instance, by the formulas Ar—$S_n$—Ar' or Ar—$S_n$—Ar", wherein Ar and Ar' are independently arylene groups, Ar" is an aryl and n is 1 to 8.

Preferably, the organic group comprises an aromatic group and/or a $C_1$–$C_{100}$ alkyl group (and more preferably a $C_1$–$C_{12}$ alkyl group) directly attached to the pigment, preferably with an ionic, ionizable, or polar group.

More than one type of organic group can be attached to the pigment, or two or more modified pigments with different attached organic groups can be used. Using two or more different types of organic groups permits a combination of properties. If two different types of organic groups are attached, for example, a sulfanilic group and a styrenic group, the sulfanilic group promotes dispersibility and the styrenic group serves as a radical grafting site. The ratio of the different organic groups can be the same or different. Preferably, only the minimum treatment level of the ionic, ionizable, or polar group is used to impart stability to the dispersion. For example, groups such as ionic species (e.g., sulphates, phosphates, alkali salts of organic acids or quaternary ammonium salts), non-ionic species (e.g., hydroxyl, organic acids) or surfactant stabilizers (e.g., SDMS, SDS, Antarox) can be used to provide stable pigment dispersions in aqueous media. Dispersion of the modified pigment in organic liquids can be facilitated in a similar manner but employing treatments which are more compatible with these less polar environments. Treatment levels of the organic group for purposes of radical grafting sites would depend on material uses. For instance, attachment of epoxy groups would facilitate grafting to hydroxyl bearing polymer matrices such as polyurethanes or polycarbonates or amine matrices such as nylon. Other examples include the attachment of radical sensitive vinyl groups such as styrenics or acrylates, or methacrylates, to facilitate crosslinking type reactions in radical polymerizations.

Also, a combination of different modified pigment can be used. For instance, a modified pigment having one type of organic group attached thereto can be used in combination with another modified pigment having a different organic group attached thereto. Also, a modified pigment such as an aggregate comprising a carbon phase and a silicon-containing species phase can be used in combination with a modified carbon product having an attached organic group, and so on.

The modified pigment which is coated with one or more polymers can have any particle size and/or surface area so long as the particle is capable of being at least partially coated with one or more polymers.

The thickness of the coating on the modified pigment can be uniformed or can vary in thickness. The thickness of the coating can be about 1 nm or more. Preferably, the polymer coated onto the modified carbon product is substantially uniform in thickness. Preferably, the thickness of the polymer coating on the modified pigment is from about 10 nm to about 100 nm, more preferably from about 20 nm to about 75 nm, and most preferably from about 30 nm to about 50 nm.

The modified carbon product can have more than one coating or shell. In other words, the modified pigment can have multiple layers of shells or coatings which partially or fully encapsulate the modified carbon product or a previous coating or shell. The polymers comprising the various layers can be the same or different For instance, one layer can be cross-linked while the next layer can be not cross-linked. Each of the various coatings, if more than one is present on the modified carbon product, can be substantially the same or vary in thickness if desired.

The polymer which is coated onto the modified carbon product can be a homopolymer, copolymer, terpolymer, and/or a polymer containing any number of different repeating units.

The polymer can be any type of polymer, such as a random polymer, alternating polymer, graft polymer, block polymer, star-like polymer, and/or comb-like polymer. The polymer can also be one or more polyblends. The polymer can be an interpenetrating polymer network (IPN); simultaneous interpenetrating polymer network (SIN); or interpenetrating elastomeric network (IEN). The polymer can be thermoplastic or thermosettable.

Specific examples of polymers include, but are not limited to, linear and non-linear polymers such as polyethylene, poly(vinylchloride), polyisobutylene, polystyrene, polycaprolactam (nylon), polyisoprene, and the like. Other general classes of polymers include polyamides, polycarbonates, polyelectrolytes, polyesters, polyethers, (polyhydroxy) benzenes, polyimides, polymers containing sulfur (such as polysulfides, (polyphenylene) sulfide, and polysulfones, polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers, silicone polymers, alkyd, epoxy, unsaturated polyester, vinyl ester, urea-, melamine-, or phenol-formaldehyde resins, and the like. Preferably, the polymer is an acrylic polymer, a methacrylic polymer, or a styrenic polymer, but would largely depend upon the intended application. For instance, reinforcement applications would generally involve the formation of a rubber product that could be attached to the modified carbon product in a manner such that the rubber product is preferably not extractable, e.g., not extractable in solvents. This can be accomplished by using a modified carbon product that has attached styrenic groups. During an aqueous media radical polymerization, the propagating chains could graft to these sites on the modified carbon product and generate a rubbery coated particle.

The polymer coated modified pigments can be made by a number of ways. Preferably, the modified pigments are made by, but are not limited to, aqueous mediated polymerization environments such as emulsion polymerization or suspension polymerization processes as well as solvent based polymerizations. The polymerizations involved are generally chain growth polymerizations and/or step growth polymerizations.

In another embodiment, the modified pigment has at least one organic group attached to the pigment particles and the organic group is positively chargeable. The organic group can be attached to the pigment in various amounts, i.e., low to high amounts, thus allowing fine control over charge modification. The organic group that is attached to the pigment particles can be any group which permits the modified pigment to be positively chargeable once incorporated into the dielectric fluid. Preferably, the organic group comprises an aromatic group or a $C_1$–$C_{20}$ alkyl group, wherein either group can be substituted or unsubstituted. It is also preferred that the aromatic group or $C_1$–$C_{20}$ alkyl group is directly attached to the pigment particles. Preferred groups of positively chargeable organic groups are nitrogen containing or phosphorus containing organic groups.

Preferred positive chargeable organic groups have the general structures:

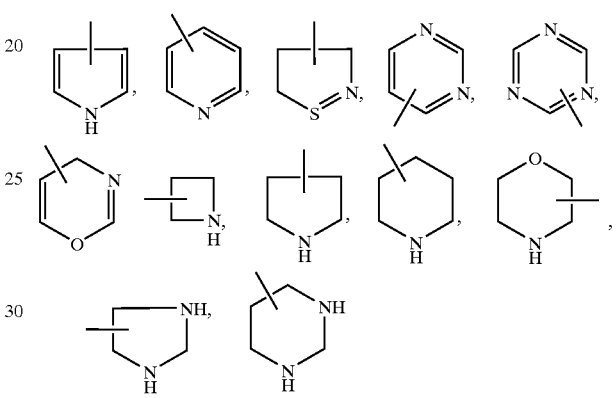

wherein Q represents the elements nitrogen or phosphorus; X represents a counterion such as Cl$^-$, BrC$^-$, ArSO$_3{}^-$, and the like; $R_1$ represents an alkylene group or an arylene group attached to the pigment; and $R_2$, $R_3$, and $R_4$, which may be the same or different, each represent an alkyl group or an aryl group. Preferably, the alkylene or alkyl group is a $C_1$–$C_{10}$ alkylene or alkyl group and the arylene or aryl group is a $C_6$–$C_{20}$ arylene or aryl group. For the purposes of this invention, aryl and arylene groups include heteroaryl and heteroarylene groups, respectively.

Other preferred organic groups that can be attached to the pigment particles include, but are not limited to the following:

| | |
|---|---|
| (C$_4$H$_9$)NHCH$_2$CH$_2$CH$_2$— | NH$_2$CH$_2$CH$_2$— |
| (C$_4$H$_9$)$_2$NCH$_2$CH$_2$CH$_2$— | NH$_2$CH$_2$CH$_2$CH$_2$— |
| (C$_8$H$_{17}$)NHCH$_2$CH$_2$CH$_2$— | NH$_2$CH$_2$CH$_2$CH$_2$CH$_2$— |
| (CH$_8$H$_{17}$)$_2$NCH$_2$CH$_2$CH$_2$— | NH$_2$CH$_2$CH$_2$CH$_2$CH$_2$CH$_2$— |
| ArNHCH$_2$CH$_2$— | NH$_2$CH$_2$CH$_2$NHCH$_2$CH$_2$CH$_2$— |
| ArNHCH$_2$CH$_2$CH$_2$— | NH$_2$CH$_2$CH$_2$NHCH$_2$CH$_2$CH$_2$NHCH$_2$CH$_2$CH$_2$— |
| ArNHCH$_2$CH$_2$CH$_2$CH$_2$— | (CH$_3$)NHCH$_2$CH$_2$CH$_2$— |
| ArNHCH$_2$CH$_2$CH$_2$CH$_2$CH$_2$— | (CH$_3$)$_2$NHCH$_2$CH$_2$CH$_2$— |
| ArArNCH$_2$CH$_2$— | (C$_2$H$_5$)NHCH$_2$CH$_2$CH$_2$— |
| ArArNCH$_2$CH$_2$CH$_2$— | (C$_2$H$_5$)$_2$NCH$_2$CH$_2$CH$_2$— |
| ArArNCH$_2$CH$_2$CH$_2$CH$_2$— | —C$_6$H$_4$(NC$_5$H$_5$)$^+$X$^-$ (as defined above) |
| ArArNCH$_2$CH$_2$CH$_2$CH$_2$CH$_2$— | —C$_5$H$_4$N(CH$_3$)$^+$X$^-$ (as defined above) |
| NH$_2$CONHCH$_2$CH$_2$CH$_2$— | |
| (CH$_3$)HCONHCH$_2$CH$_2$CH$_2$— | |
| (CH$_3$)$_2$NCONHCH$_2$CH$_2$CH$_2$— | |

-continued (C$_2$H$_5$)NHCONHCH$_2$CH$_2$CH$_2$—
(C$_2$H$_5$)$_2$NCONHCH$_2$CH$_2$CH$_2$—
(C$_4$H$_9$)NHCONHCH$_2$CH$_2$CH$_2$—
(C$_4$H$_9$)$_2$NCONHCH$_2$CH$_2$CH$_2$—
CH$_3$OCOCH$_2$CH$_2$NHCH$_2$CH$_2$CH$_2$—
(C$_2$H$_5$)OCOCH$_2$CH$_2$NHCH$_2$CH$_2$CH$_2$—
(C$_4$H$_9$)OCOCH$_2$CH$_2$NHCH$_2$CH$_2$CH$_2$—
NH$_2$Ar—
(CH$_3$)NHAr—
(CH$_3$)$_2$NAr—
NH$_2$CH$_2$Ar—
(CH$_3$)$_2$NCH$_2$Ar—
(CH$_3$)$_2$NCH$_2$CH$_2$Ar—
NH$_2$CH$_2$CH$_2$Ar—
(CH$_3$)NHCH$_2$CH$_2$Ar—
(CH$_3$)$_2$NCH$_2$CH$_2$Ar—
Cl$^-$(CH$_3$)$_3$N$^+$CH$_2$CH$_2$CH$_2$—
Cl$^-$(C$_2$H$_5$)$_3$N$^+$CH$_2$CH$_2$CH$_2$—
Cl$^-$(C$_4$H$_9$)$_3$N$^+$CH$_2$CH$_2$CH$_2$—
Cl$^-$(C$_2$H$_5$)(CH$_3$)$_2$N$^+$CH$_2$CH$_2$CH$_2$—
Cl$^-$(C$_4$H$_9$)(CH$_3$)$_2$N$^+$CH$_2$CH$_2$CH$_2$—
Cl$^-$(C$_8$H$_{17}$)(CH$_3$)$_2$N$^+$CH$_2$CH$_2$CH$_2$—
(HOCH$_2$CH$_2$)$_2$NCH$_2$CH$_2$CH$_2$—
(HOCH$_2$CH$_2$)$_2$NAr—

—Ar—SO$_2$NH(C$_4$H$_3$N$_2$)

in which Ar represents an aromatic group and Ar' represents an aromatic group. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like). In a similar manner, negatively chargeable particles can be produced using the appropriate functional groups, such as sulfonamides.

A combination of organic groups such as an organic group comprising a pyridyl group and an organic group comprising a quaternary ammonium group can be used.

As stated, the organic group is a $C_1$–$C_{100}$ alkyl group (more preferably a $C_1$–$C_{12}$ alkyl group), an aromatic group, or other organic group, monomeric group, or polymeric group, each optionally having a functional group or ionic or ionizable group. More preferably, these groups are directly attached to the particles.

The polymeric group can be any polymeric group capable of being attached to a particle. The polymeric group can be a polyolefin group, a polystyrenic group, a polyacrylate group, a polyamide group, a polyester group, or mixtures thereof. Monomeric groups are monomeric versions of the polymeric groups.

The organic group can also be an olefin group, a styrenic group, an acrylate group, an amide group, an ester, or mixtures thereof. The organic group can also be an aromatic group or an alkyl group, either group with an olefin group, a styrenic group, an acrylate group, an amide group, an ester group, or mixtures thereof, wherein preferably the aromatic group, or the alkyl group, like a $C_1$–$C_{12}$ group, is directly attached to the particle.

The polymeric group can include an aromatic group or an alkyl group, like a $C_1$–$C_{12}$ group, either group with a polyolefin group, a polystyrenic group, a polyacrylate group, a polyamide group, an polyester group, or mixtures thereof.

The organic group can also comprise an aralkyl group or alkylaryl group, which is preferably directly attached to the carbon product. Other examples of organic groups include a $C_1$–$C_{100}$ alkyl group, and more preferably a $C_{20}$–$C_{60}$ alkyl group.

Examples of other organic groups are organic groups having the following formulas (hyphens on one or more ends represents an attachment to a particle or to another group):

—Ar—CO$_2$(C$_m$H$_{2m+1}$), where m=0 to about 20;

—Ar—(C$_n$H$_{2n+1}$), where n=1 to about 50;

—Ar—C$_p$H$_{2p}$Ar—, where p=1 to about 10;

—Ar—CX$_3$, where X is a halogen atom;

—Ar—O—CX$_3$, where X is a halogen atom;

—Ar—SO$_3^-$;

—Ar—SO$_2$(C$_q$H$_{2q-1}$), where q=about 2 to about 10;

—Ar—S$_2$Ar—NH$_2$;

—Ar—S$_2$—Ar—;

—Ar—SO$_2$H;

—Ar—((C$_n$H$_{2n}$)COOX)$_m$, where n=0 to 20, m=1 to 3, and X=H, cations, or organic group; These groups can be further activated and/or reacted with such groups as carbodiimides and further reacted with NH$_2$-terminated functionalization groups; SOCl$_2$, or PCl$_3$, or PCl$_5$ to be converted to —Ar—(C$_n$H$_{2n}$)COCl)$_m$ groups and further reacted with OH-terminated functionalization groups.

—Ar—((C$_n$H$_{2n}$)OH)$_m$, where n=0 to 20, m=1 to 3; These groups can be further activated and/or reacted with such groups as tosyl chloride and subsequently reacted with amino-terminated ligands; carbonyldiimidazole and subsequently reacted with amino-terminated ligands; carbonylchloride terminated ligands; and epoxy terminated ligands.

—Ar—((C$_n$H$_{2n}$)NH$_2$)$_m$, where n=0 to 20, m=1 to 3, and its protonated form: —Ar—((C$_n$H$_{2n}$)NH$_3$X)$_m$, where X is an ion; These groups can be further activated and/or reacted with such groups as carbodiimide activated carboxyl-terminated ligands; carbonyidiimidazole activated hydroxy-terminated ligands; tosyl activated hydroxy-terminated ligands; vinyl terminated ligands; alkylhalide terminated ligands; or epoxy terminated ligands.

—Ar—((C$_n$H$_{2n}$)CHNH$_3^{30}$ COO)$_m$ where n=0 to 20 and m=1 to 3; These groups can be derivatized further by reaction through the carboxylic group by reaction with $NH_2$ or OH terminated groups or through the amino group by reaction with activated carboxy-terminated ligands, activated hydroxy-terminated ligands, vinyl ligands, alkyl halide terminated ligands, or epoxy terminated ligands.

—Ar—$((C_nH_{2n})CH=CH_2)_m$, where n=0 to 20, m=1 to 3 or —Ar—$((C_nH_{2n})SO_2CH=CH_2)_m$, where n=0 to 20, m=1 to 3. These groups can be further activated and/or reacted with such groups as amino-terminated ligands; peroxy-acids to form epoxides and subsequently reacted with hydroxy- or amino-terminated ligands; hydrogen halides to form —Ar$((C_nH_{2n})CH_2CH_2X)_m$ groups and subsequently reacted with amino-terminated ligands.

or mixtures thereof. Other reaction schemes can be used to form various groups onto the particles.

Other mixtures of organic groups include the following:

—Ar—$SO_3^-$ and —Ar$(C_nH_{2n+1})$, where n=1 to about 50;

—Ar—$S_2$—Ar—$NH_2$ and —Ar$C_pH_{2p}$Ar—, where p=1 to about 10;

—Ar—$S_2$—Ar— and —Ar$C_pH_{2p}$Ar—, where p=1 to about 10; or at least two different —Ar—$CO_2(C_mH_{m+1})$, where m=0 to about 20.

The various organic, monomeric, and polymeric groups described above and below which are part of the modified particles can be unsubstituted or substituted and can be branched or linear.

As described earlier, one or more organic groups can be attached to the pigment. Further, two or more modified pigments, each having a different organic group attached to the pigment, can be used. Also, one organic group having an ionic or ionizable group can be used in connection with a second or additional organic groups with or without ionic or ionizable groups and so on.

Though not necessary, surface treatment agents and other conventional ingredients can be used in the present invention.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A gyricon display comprising:
   a) an arrangement of capsules, wherein each capsule comprises a bichromal ball having two hemispheres, wherein one of the hemispheres has at least a surface comprising a colored pigment having directly attached at least on organic group and the other hemisphere has at least a surface with a different color and different electrical properties, wherein each ball is enclosed within a shell wherein a liquid is preset between the shell and ball so that the ball is free to rotate in response to an electrical field;
   b) first and second electrodes wherein said arrangement is located between said electrodes and wherein at least one of the electrodes is substantially visually transparent; and
   c) means for creating a potential difference between the two electrodes, wherein said potential difference causes said bichromal balls to rotate toward one of the electrodes.

2. The gyricon display of claim 1, wherein said bichromal ball is said modified colored pigment.

3. The gyricon display of claim 1, wherein said bichromal ball comprises a pigment with at least one of said hemispheres comprising a surface containing said modified colored pigment.

4. The gyricon display of claim 1, wherein said organic group comprises at least one aromatic group, at least one $C_1$–$C_{100}$ alkyl group, or mixture thereof.

5. The gyricon display of claim 1, wherein said colored pigment is carbon black.

6. The gyricon display of claim 1, wherein said at least one group comprises —X-Sp-$[NIon]_pR$, —X-Sp-$[(—CH_2)_m—O—)_p—R]$, or —X-Sp-[polymer]R, wherein X represents an aromatic group or an alkyl group, NIon represents at least one non-ionic group, Sp represents a spacer group, R represents hydrogen, an aromatic group, or an alkyl group, p is an integer of from 1 to 500, m is an integer of from 1 to 12, and "polymer" comprises repeating monomer groups or multiple monomer groups.

7. The gyricon display of claim 1, wherein said colored pigment having attached at least one group comprises —X-Sp-$[A]_pR$, wherein X represents an aromatic group or an alkyl group, Sp represents a spacer group, A represents an alkylene oxide group of from about 1 to 12 carbons, p represents an integer of from 1 to 500, and R represents hydrogen, a substituted or unsubstituted alkyl group, or a substituted or unsubstituted aromatic group.

8. A visual display device or display media comprising an arrangement of particles, wherein an optical response results from the rotation of said particles in a fluid, wherein a portion of said particles have attached at least one organic group having an ionic group, ionizable group, or both, and wherein said arrangement of particles is located in said visual display device or said display media, and wherein said organic group comprises at least one aromatic or alklyl group that is directly attached to at least a portion of said particles.

9. The visual display device or display media of claim 8, wherein said particles are colored pigments, and wherein said organic group comprises at least one aromatic group, at least one $C_1$–$C_{100}$ alkyl group, or mixtures thereof.

10. The visual display device or display media of claim 8, wherein said particles are carbon black.

11. The visual display device or display media of claim 8, wherein said at least one group comprises —X-Sp-$[NIon]_pR$, —X-Sp-$[(—CH_2)_m—O—)_p—R]$, or —X-Sp-[polymer]R, wherein X represents an aromatic group or an alkyl group, NIon represents at least one non-ionic group, Sp represents a spacer group, R represents hydrogen, an aromatic group, or as alkyl group, p is an integer of from 1 to 500, m is an integer of from 1 to 12 and "polymer" comprises repeating monomer groups or multiple monomer groups.

12. The visual display device or display media of claim 8, wherein said particles having attached at least least one group comprises —X-Sp-$[A]_pR$, wherein X represents an aromatic group or an alkyl group Sp represents a spacer group, A represents an alkylene oxide group of from about 1 to 12 carbons, p represents an integer of from 1 to 500, and R represents hydrogen, a substituted or unsubstituted alkyl group, or a substituted or unsubstituted aromatic group.

13. A capsule comprising a bichromal ball having two hemispheres, wherein one of the hemispheres has at least a surface comprising a colored pigment having directly attached at least one organic group and the other hemisphere has at least a surface with a different color and different electrical properties, wherein said ball is enclosed within a shell wherein a liquid is present between the shell and ball so that the ball is free to rotate.

14. A capsule comprising a polychromal ball having two or more segments, wherein one of the segments comprises a colored pigment having attached at least one organic group and the other segment has a different color and different electrical properties, wherein said ball is enclosed within a shell wherein a liquid is present between shell and ball so that the ball is free to rotate.

15. A gyricon display comprising:
   a) an arrangement of capsules, wherein each capsule comprises a bichromal element having two segments, wherein one of the segments comprises a colored pigment having attached at least one organic group and the other segment has at least a surface with a different color and different electrical properties, wherein each element is enclosed within a shell wherein a liquid is present between the shell and element so that the element is free to rotate in response to an electrical field;
   b) first and second electrodes wherein said arrangement is located between said electrodes and wherein at least one of the electrodes is substantially visually transparent; and
   c) means for creating a potential difference between the two electrodes, wherein said potential difference causes said bichromal elements to rotate toward one of the electrodes.

16. The gyricon display of claim 15, wherein said bichromal element is a cylinder, a rod, a needle, a ball, or combinations thereof.

17. The gyricon display of claim 15, wherein said organic group comprises at least one aromatic group, at least one $C_1$–$C_{100}$ alkyl group, or mixtures thereof.

18. The gyricon display of claim 15, wherein said colored pigment is carbon black.

19. The gyricon display of claim 15, wherein said at least one organic group comprises —X-Sp-[NIcon]$_p$R, —X-Sp-[(—CH$_2$)$_m$—O—)$_p$—R], or —X-Sp-[polymer]R, wherein X represents an aromatic group or an alkyl group, NIon represents at least one non-ionic group, Sp represents a spacer group, R represents hydrogen, an aromatic group, or an alkyl group, and p is an integer of from 1 to 500, m is an integer of from 1 to 12, and "polymer" comprises repeating monomer groups or multiple monomer groups.

20. The gyricon display of claim 15, wherein said colored pigment having attached at least one organic group comprises —X-Sp-[A]$_p$R, wherein X represents an aromatic group or an alkyl group, Sp represents a spacer group, A represents an alkylene oxide group of from about 1 to about 12 carbons, p represents an integer of from 1 to 500, and R represents hydrogen, substituted or unsubstituted alkyl group, or a substituted or unsubstituted aromatic group.

21. A gyricon display comprising:
   (a) an arrangement of capsules, wherein each capsule comprises a polychromal element having at least two segments, wherein one of the segments comprises a colored pigment having attached at least one organic group and the other segment has a different color and different electrical properties, wherein each element is enclosed within a shell wherein a liquid is present between the shell and element so that the element is free to rotate in response to an electrical field;
   (b) first and second electrodes wherein said arrangement is located between said electrodes and wherein at least one of the electrodes is substantially visually transparent; and
   (c) means for creating a potential difference between the two electrodes, wherein said potential difference causes said polychromal elements to rotate toward one of the electrodes.

22. The gyricon display of claim 21, wherein said polychromal element is a cylinder, a rod, a needle, a ball, or combinations thereof.

23. A visual display device or display media comprising a) an arrangement of capsules, wherein an optical response results from the rotation of elements in a fluid within said capsule, wherein a portion of the elements comprises a colored pigment having attached at least one organic group having an ionic group, ionizable group, or both; and b) means to cause the controlled rotation of the elements to achieve said optical response, and wherein said arrangement of capsules is located in said visual display device or said display media, and wherein said organic group comprises at least one aromatic or alkyl group that is directly attached to at least a portion of said colored pigment.

24. A capsule comprising a bichromal element having two segments, wherein one of the segments comprises a colored pigment having attached at least one organic group and the other segment has at least a surface with a different color and different electrical properties, wherein each element is enclosed within a shell wherein a liquid is present between the shell and the element so that the element is free to rotate.

25. A capsule comprising a polychromal element having at least two segments, wherein one of the segments comprises a colored pigment having attached at least one organic group and the other segment has a different color and different electrical properties, wherein each element is enclosed within a shell wherein a liquid is present between the shell and the element so that the element is free to rotate.

26. The capsule of claim 25, wherein said organic group comprises at least one aromatic group, at least one $C_1$–$C_{100}$ alkyl group, or mixtures thereof.

27. The capsule of claim 25, wherein said colored pigment is carbon black.

28. The capsule of claim 25, wherein said modified colored pigment having attached at least one organic group comprises —X-Sp-[NIon]$_p$R, —X-Sp-[(—CH$_2$)$_m$—O—)$_p$—R], or —X-Sp-[polymer]R, wherein X represents an aromatic group or an alkyl group, a NIon represents at least one non-ionic group, Sp represents a spacer group, R represents hydrogen, an aromatic group or an alkyl group, and p represents an integer of from 1 to 500, m is an integer of from 1 to 12, and "polymer" comprises repeating monomer groups or multiple monomer groups.

29. The capsule of claim 25, wherein said pigment having attached at least one organic group comprises —X-Sp-[A]$_p$R, wherein X represents an aromatic group or an alkyl group, Sp represents a spacer group, A represents an alkylene oxide group of from about 1 to about 12 carbons, p represents an integer of from 1 to 500, and R represents hydrogen, a substituted or unsubstituted alkyl group.

* * * * *